United States Patent [19]
Karlovics

[11] 3,735,189
[45] May 22, 1973

[54] BLUE DROOP CORRECTION CIRCUIT WITH A SINGLE SUPPLEMENTAL CORRECTION COIL

[75] Inventor: Steven Karlovics, Chicago, Ill.

[73] Assignee: Zenith Radio Corporation, Chicago, Ill.

[22] Filed: Mar. 19, 1971

[21] Appl. No.: 126,096

[52] U.S. Cl..........315/13 CG, 315/13 C, 315/27 XY, 315/27 GD, 315/31 TV
[51] Int. Cl...........H01j 29/50
[58] Field of Search..........315/13 C, 13 CG, 315/27 XY, 27 GD, 31 TV

[56] References Cited

UNITED STATES PATENTS

| | | | |
|---|---|---|---|
| 3,141,109 | 7/1969 | Chandler | 315/27 XY |
| 3,430,099 | 2/1969 | Ashley | 315/13 C |
| 2,903,622 | 9/1969 | Schopp | 315/13 C X |
| 3,421,043 | 1/1969 | MacIntyre, Jr. et al. | 315/13 CG |
| 3,500,114 | 3/1970 | Samai | 315/13 C |
| 3,548,248 | 12/1970 | Tokita et al. | 315/13 C |
| 3,560,793 | 2/1971 | Payen | 315/13 C |
| 3,575,625 | 4/1971 | Miyaoka | 315/13 CG |

FOREIGN PATENTS OR APPLICATIONS

| | | | |
|---|---|---|---|
| 21,136 | 1969 | Japan | 315/27 GD |

*Primary Examiner*—Benjamin R. Padgett
*Assistant Examiner*—P. A. Nelson
*Attorney*—John J. Pederson and Cornelius J. O'Connor

[57] ABSTRACT

A supplemental dynamic field structure is associated primarily only with the blue gun of a tri-color cathode-ray tube having three guns in a delta array with the blue gun disposed above the plane of the red and green guns. The supplemental field structure is energized by the horizontal-frequency component of exciting current applied to the conventional blue dynamic convergence electromagnet, providing a field ahead of the principal convergence system which prebends the blue beam in an opposite sense to that of the principal convergence system. As used here, the expression "-blue beam" is intended to define the electron beam designated to excite the blue phosphor dots of the phosphor dot triads of the image screen.

The field of the supplemental electromagnetic structure may be confined to prebend the blue beam alone or it may be permitted to extend to and occasion prebending of reduced magnitude of both the red and green beams but in a sense opposite that experienced by the blue beam.

7 Claims, 11 Drawing Figures

Inventor
Steven Karlovics
By Francis W. Crotty
Attorney

Inventor
Steven Karlovics
By Francis W. Crotty
Attorney

Inventor
Steven Karlovics

By Francis W. Crotty
Attorney

BLUE DROOP CORRECTION CIRCUIT WITH A SINGLE SUPPLEMENTAL CORRECTION COIL

BACKGROUND OF THE INVENTION

The invention concerns generally correction of triad astigmatism attributable to astigmatism of the yoke and, therefore, in the deflection field of a shadow mask color tube having a delta array of three electron guns. For the most part in structures of this type, two of the guns are disposed in the same horizontal plane while the third is vertically displaced so that collectively they define an equilateral triangle. It is common practice to have the red and green guns horizontal and the blue gun disposed above them. The guns are mechanically converged to the end that the three electron beams which they produce are converged to be in registration with the phosphor dot triads at the center of the raster or image screen of the picture tube.

It is well known as described, for example, in U.S. Pat. No. 2,885,935, issued May 12, 1959, U.S. Pat. No. 3,282,691, issued Nov. 1, 1966 and U.S. Pat. No. 3,492,526, issued Jan. 27, 1970, that a variety of triad errors may be encountered in the manufacture and operation of this kind of tube. The expression "triad errors" is here used in a collective sense to encompass possible errors of the phosphor-dot triads attributable to deficiencies in the photomechanical printing process through which the phosphors are applied to the faceplate of the tube as well as in the beam landing spot triads hereinafter referred to as "spot triads" resulting usually from astigmatism of the magnetic deflection yoke employed in scanning the beam triad over the image screen. The particular kind of distortion for which the present invention contributes correction is that related to astigmatism of the deflection field which distorts the spot triad out of a desired equilateral configuration. The amount and nature of the distortion vary with deflection of the beam triad from the center of the raster. At extreme positions of horizontal deflection, referred to in the art as the 3 and 9 o'clock positions, the greatest distortion of the spot triad is in the vertical direction, whereas at positions of maximum vertical deflection, usually alluded to as the 6 and 12 o'clock positions, the greatest distortion is a horizontal elongation of the spot triad. Collectively, these are referred to as triad astigmatism and those experienced at the 3 and 9 o'clock positions are generally the most objectionable. Since the degree of triad astigmatism is a function of deflection angle, it is more severe in 110° than in 90° color tubes and, while correction for such distortion may be a desirable option with 90° tubes, it may prove necessary for 110° tubes. Since triad astigmatism is most offensive at the 3 and 9 o'clock positions, as stated, wherein the blue beam suffers a greater vertical displacement than the horizontal displacements of the red and green beams resulting from astigmatism of deflection field, this type of defect has come to be known as "blue droop". For convenience of explanation, that terminology will be employed hereinafter.

One approach to lessening operational problems attendant the presence of blue droop is second order printing of the screen. This is basically the same type of photomechanical printing otherwise used in the color tube art but modified as to the location of the exposing light source in determining the locations of the interleaved series of phosphor dots which define the dot triads of the screen. The effort is to print dot triads which, instead of being equilateral over the entire image screen, depart from this ideally correct configuration to simulate the blue droop distortion of the spot triad in scanning. That is to say, at the 3 and 9 O'clock positions the dot triad is changed principally by increasing its vertical dimension while at the 6 and 12 o'clock positions it is changed principally by increasing the horizontal dimension. This is an attempt to preserve proper landing of the electron beams with respect to the assigned phosphor deposits throughout the raster but amounts to introducing a second distortion to compensate astigmatic distortion of the spot triad.

The present invention proceeds on a different basis in accordance with which, ideally, equilateralism of the dot triads is retained over the image screen and correction is introduced by compensating for blue droop by a prebending of at least the blue beam. In some respects, the structure employed is like that of U.S. Pat. No. 3,492,526 — Pappadis, referred to above which is assigned to the assignee of the present invention. While they bear a structural resemblance, the Pappadis arrangement is addressed to correcting a different type of error, that which is referred to as beam triad degrouping error, resulting from the fact that the color-center triangle, defined by the penetration of the three beams into the plane of deflection, tends to change size with deflection angle while retaining equilateralism. As distinguished from that problem, the present invention concerns blue droop and is a correction for the distortion related to the fact that conventional dynamic convergence in the presence of yoke astigmatism causes displacement of the blue beam that is significantly different from the displacements of the red and green beams, the latter experiencing essentially equal displacements.

Accordingly, it is an object of the invention to improve a color television system by introducing a novel form of blue droop correction.

In a more general sense, it is an object of the invention to compensate triad astigmatism resulting from astigmatism of the yoke deflection field.

It is a particular object of the invention to introduce blue droop correction at least at the 3 and 9 o'clock positions of the image screen although the correction can further be extended to be effective at other positions of the raster.

SUMMARY OF THE INVENTION

A color television system, which may benefit from the subject invention, comprises a cathode-ray tube having an image screen bearing a multiplicity of phosphor dot triads individually including a dot of green, a dot of blue and a dot of red phosphor and further having three electron guns for producing a delta array of three electron beams for exciting an assigned color phosphor of the phosphor triads. A magnetic deflection yoke produces across the paths of those beams a scanning field for deflecting the beams over the screen in a repeating series of parallel lines A dynamic convergence system of conventional design, including electromagnetic means associated with each of the three beams respectively and energized by currents of horizontal and vertical frequencies, develops dynamic convergence fields for maintaining the three beams converged to define an equilateral beam spot triad in registration with the phosphor dot triads as the beams are scanned by the deflection field over the screen. But, in the presence of astigmatism in the deflection field the beam spot triangle becomes distorted in that two of the beams are displaced in the same sense relative to the center of the equilateral spot triad while the third beam is displaced in an opposite sense relative to the center of the equilateral spot triad. The present invention improves a receiver system of that construction by providing a single supplemental field developing structure energized by the horizontal or vertical frequency component of the dynamic signal applied only to the one of the aforesaid electromagnetic means which is associated with the third beam. This structure develops a supplementing dynamic field component at the horizontal or vertical frequency which is opposite in polarity to, and has a time-intensity characteristic related to that of, the corresponding dynamic field component of the aforesaid one electromagnetic means to compensate the astigmatism.

In one specific embodiment, the supplemental field developing structure is a separate dynamic electromagnetic system which affects predominantly the blue beam to prebend it, so to speak, ahead of and in a sense opposite to the bending or displacement of that beam by the conventional convergence system. This supplemental system in one case is energized by the horizontal frequency component of the blue convergence excitation signal and its field extends, even though of smaller magnitude, to influence and prebend both the red and green beams as well but in a direction opposite to that of the prebending of the blue beam in respect of the center of the beam spot triangle.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 9:
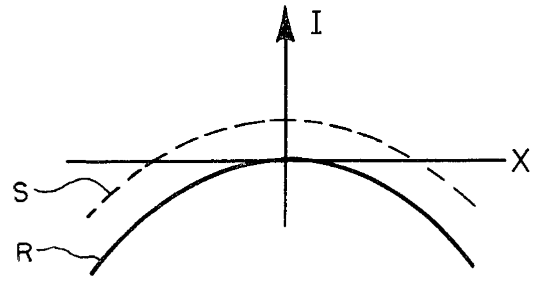
Figure 10:
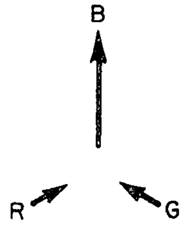
Figure 8:
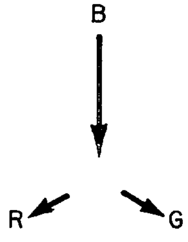

FIGS. *7a* and *7b* represent structural views of one embodiment of the invention;

FIGS. 8 and 10 are vector diagrams used in explaining the phenomenon of blue droop correction; and FIG. 9 illustrates the waveform of correcting current employed in obtaining the correction.

DESCRIPTION OF THE PREFERRED EMBODIMENT

Figures 1, 2:
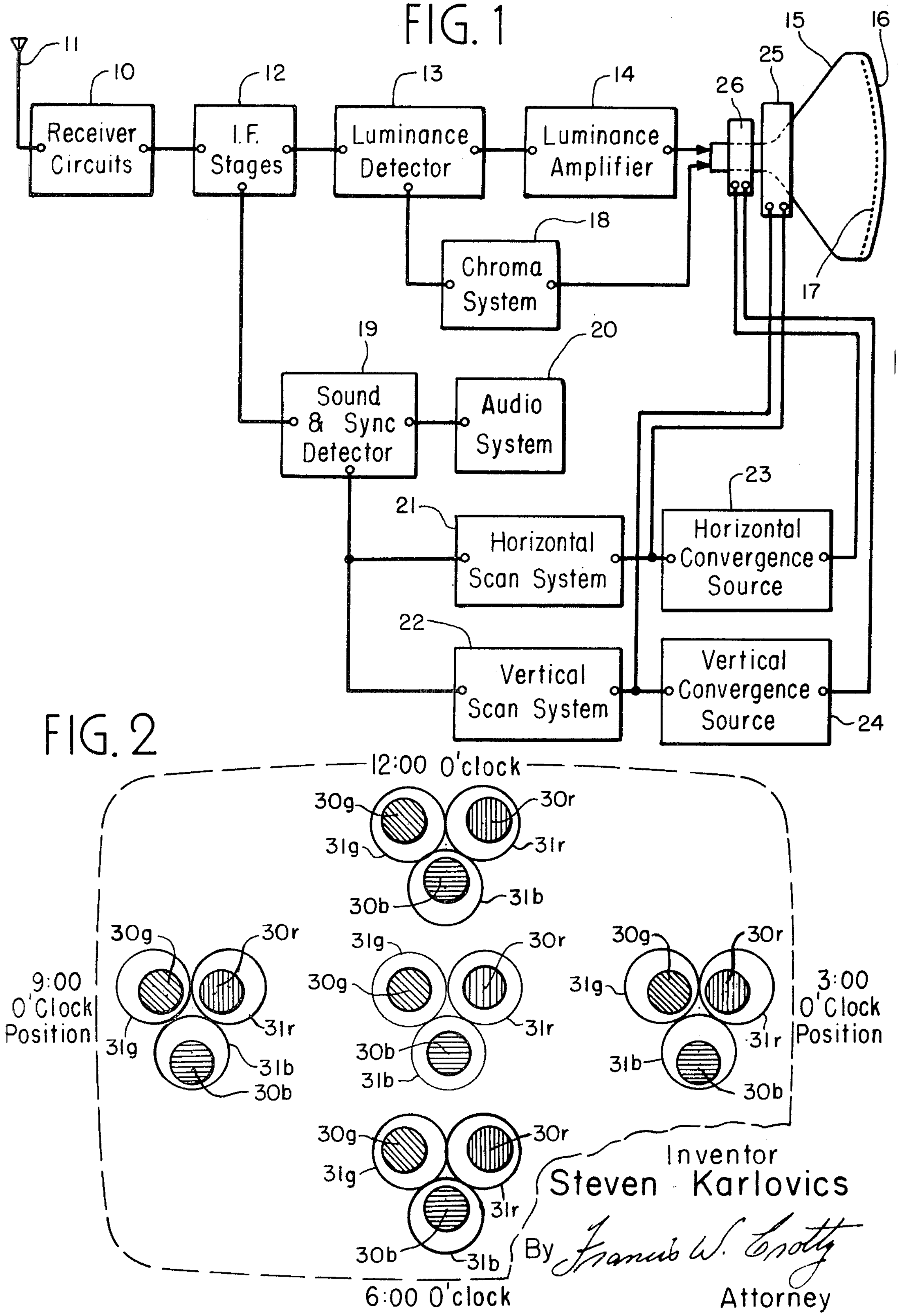
FIG. 1 is a block diagram of a color television receiver that may utilize the subject invention.
FIGS. 2 and 3 are sketches employed in describing blue droop distortion.

The color receiver represented schematically in FIG. 1 comprises receiver circuits 10 to which color broadcast signals are supplied from an antenna 11. It will be assumed that unit 10 includes all of the customary stages down to and including the first detector which delivers the desired program signal at an appropriate intermediate frequency to IF amplifier 12. The output of this amplifier is detected in a luminance detector 13 from which the luminance information is delivered through an amplifier 14 to the input of a cathode-ray color picture tube or image-reproducing device 15. The tube is of the shadow-mask variety having on its screen 16 a regularly repeating pattern of phosphor-dot triads each of which comprises a dot of red, a dot of blue and a dot of green phosphor. Color selection by having three beams generated within the tube energize only the color-phosphor dots assigned to each of them is achieved by the usual shadow mask 17. The reduced diameter neck section of the tube envelope houses the usual cluster of three electron guns. It will be assumed that the electron beams developed by the red and green guns, i.e., those assigned to excite the red and green phosphor deposits, respectively, are in a common horizontal plane while the beam developed by the third gun, which excites the blue phosphor dots, is above the other two. The beams are mechanically converged so that collectively they define an equilateral beam spot triangle at the center of the screen, dimensioned and positioned to be in registration with the phosphor dot triad on which they impinge. Ideally, this condition of registration is maintained as the beams are scanned across the image screen. A second output of detector 13 is applied to a chroma system 18 which demodulates the chroma information so that there is applied to the input electrodes of the three guns of tube 15 both the luminance and the chroma information as required for the reproduction of images in simulated natural color.

A second output from IF amplifier 12 is applied to a sound and sync detector 19 in which the intercarrier sound component is derived for application to and utilization by an audio system 20. The synchronizing information developed in detector 19 is applied to both a horizontal and a vertical scanning system 21 and 22, respectively. Scanning signal outputs of these systems energize the usual deflection yoke 25 of the picture tube so that the three beams thereof are controlled to scan the screen in a rectangular pattern comprised of a repeating series of image fields of spaced horizontal lines. This scanning, of course, results from a deflection field that yoke 25 produces across the paths of the beams. Because of the described delta gun arrangement the red and green beams penetrate the plane of deflection, which is located about midway of the yoke, at two points of about equal field intensity while the blue beam penetrates that plane at a third point, above the other two. The third point is at different, specifically higher, field intensity and along with the aforementioned two points defines an equilateral color center triangle in the plane of deflection.

Element 26 is a schematic representation of the electromagnetic structure of the conventional dynamic convergence system which includes electromagnetic means associated with each of the three beams, respectively. The convergence system further comprises sources for supplying to the electromagnetic structure dynamic convergence signals at both the horizontal and vertical frequencies; as shown, these signals are developed in a horizontal convergence source 23 and a vertical convergence source 24. Generally, the convergence signals are derived from the scanning systems so as to correlate the convergence fields to deflection angle and, therefore, sources 23 and 24 are shown coupled to canning s stems 21 and 22. As well understood, the convergence fields tend to maintain the three beams converged, as described above, while they are scanned by the deflection field across the raster or image screen of tube 15.

As thus far described, the receiver is totally conventional both as to structure and mode of operation. Briefly, turning of input circuits 10 permits a desired broadcast signal to be selected and, after being operated upon in the various stages of the receiver, it is applied as a luminance signal and as a chroma signal to picture tube 15 as the beams of that tube repetitively scan screen 16. The modulation of these beams with luminance and chrominance information and the color selection afforded by shadow mask 17 result in the receiver's responding to the incoming program signal to reproduce the translated image in simulated natural color. At the same time, the audio information is reproduced and the timing of the receiver is maintained in proper relation to the transmission by the scanning systems 21, 22. Additionally, dynamic convergence signals delivered to electromagnetic structure 26 create convergence fields tending to maintain the three beams properly converged at all points in the scanning raster.

Figure 3:
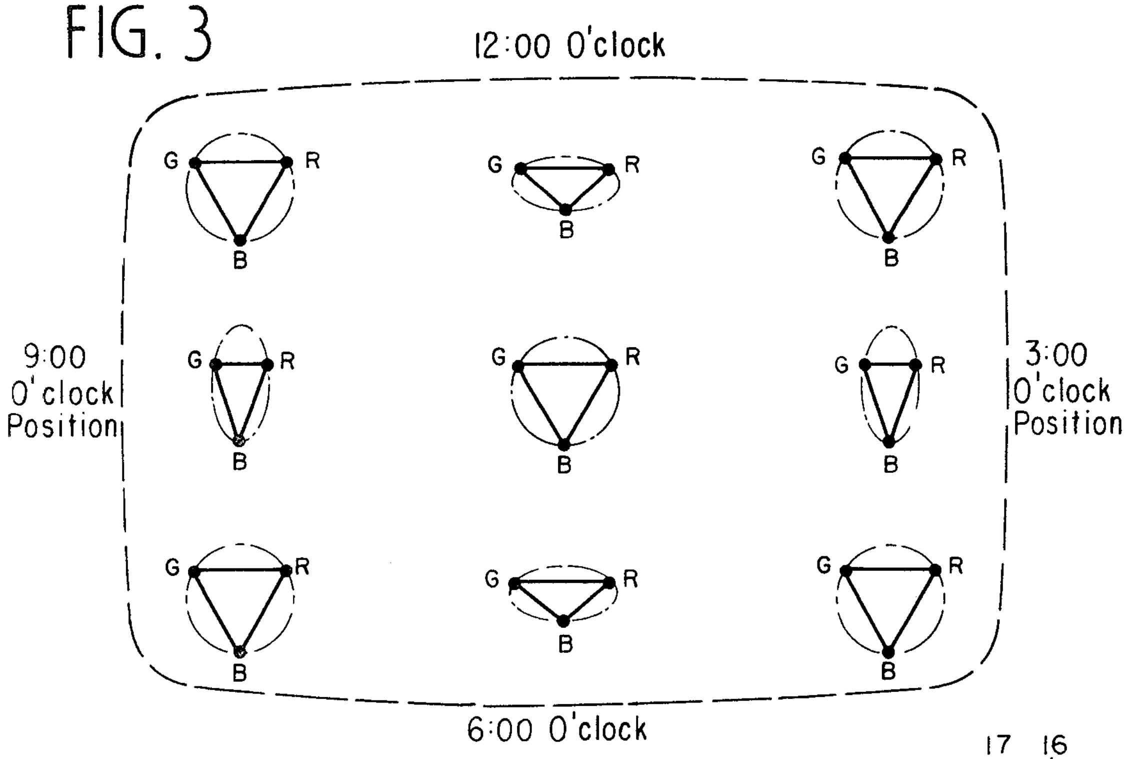

Ideally, the described receiver exhibits color fidelity but optimum performance is hard to achieve because of astigmatism that is usually encountered in commercially available deflection yokes. The presence of astigmatism in the deflection field distorts the beam spot triangle by displacing two of the beams, specifically the red and green beams, in the same sense relative to the center of the ideal equilateral beam spot triangle while displacing the third or blue beam in an opposite sense relative to the center of the equilateral spot triad. The distortion is clearly shown in FIGS. 2 and 3 at the screen locations designated 3, 6, 9 and 12 0'clock. The optimum relation is one in which the beam spots defining the spot triangle are in registration with, that is to say, in concentric relation to the dots constituting the phosphor dot triangle and this ideal condition is found at the center of the screen, being established primarily by mechanical convergence of the three electron guns. The crosshatched circles 30*r*, 30*g* and 30*b* represent the spot triad while the larger circles 31*r*, 31*g* and 31*b* represent the phosphor-dot triad. Observe the registration at the center of the screen in which each spot is concentric with its assigned phosphor dot, providing a guard band. The guard band is the band defined by the external periphery of each spot and the external periphery of its associated phosphor dot and is necessary to allow manufacturing tolerances for maintaining color purity.

It should be noted in passing that the representation in FIG. 2 is characteristic of a conventional picture tube having tangent phosphor dots and spots of smaller diameter than the phosphor dots in order to maintain color purity. A different arrangement may be employed that uses the inverse size relation with the phosphor dots smaller in diameter than the electron beam spots. Dimensioning of this character is used in the preferred form of a so-called black-surround color tube described and claimed in U.S. Pat. No. 3,146,368, issued on Aug. 25, 1964 and assigned to the assignee of the present invention as is also the case with tubes of the post-deflection-focus type. In general, the present discussion applies equally to both screen structures but, for convenience, the disclosure will proceed on the arrangement of the type illustrated in FIG. 2.

A comparison of the registration pattern at the center of the screen with that at the 3 and 9 o'clock positions shows that the red and green spots have become grouped, that is to say, have moved closer to one another while the blue spot has become degrouped or moved further away from the plane of the red and green spots. The degrouping or droop of the blue spot is the greater of the two distortions. At the 6 and 12 0'clock positions, however, the obverse situation prevails in that the red and green spots are degrouped and the blue spot has become grouped.

Figure 4:
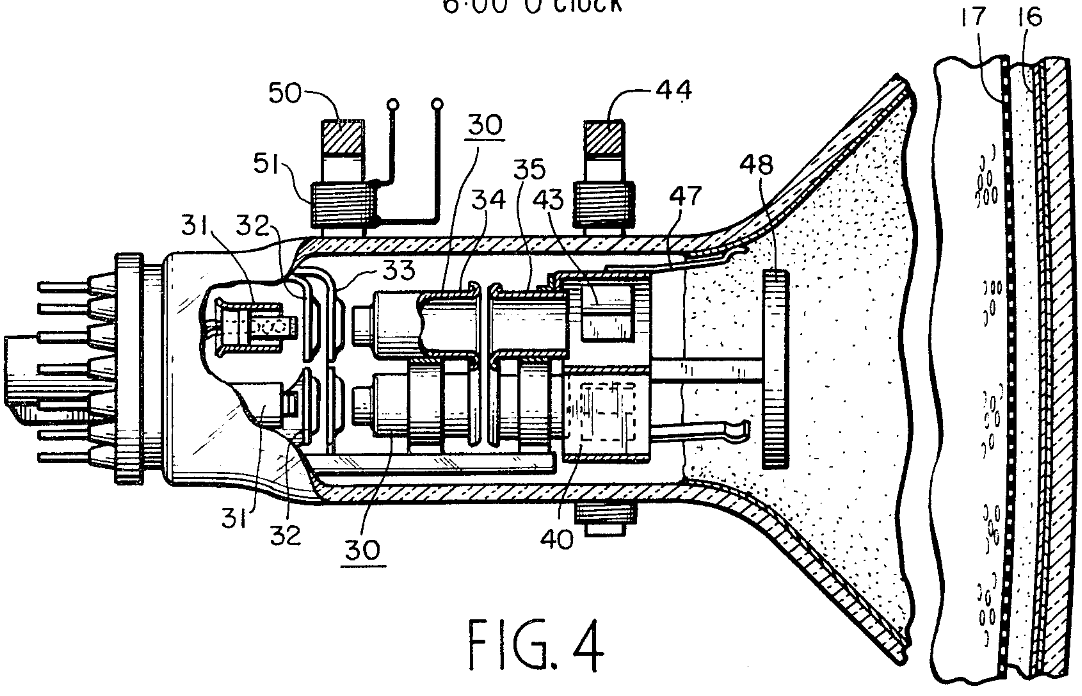
FIGS. 4 and 5 illustrate structural details of a color picture tube embodying the invention.
Figure 5:
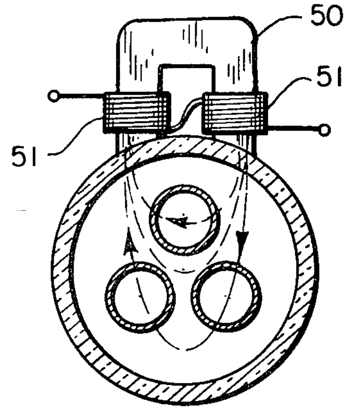

The subject invention improves matters by correcting or compensating this distortion. It may be utilized to correct blue droop alone or may also have a correcting influence on the positions of the red and green spots as well. Correction is achieved by means of a single supplemental field developing structure energized at either or both the horizontal and vertical frequency components of exciting current applied to the electromagnetic means of the normal dynamic convergence system 26 which is associated primarily only with the blue beam to develop a supplementing blue dynamic field component at the horizontal, vertical or both frequencies which is opposite in polarity to, and has a time-intensity characteristic related to that of, the corresponding dynamic field component of the section of the dynamic convergence system operating on the blue beam. In the simplest embodiment, all that is required is a supplemental electromagnetic beam bender to prebend the blue beam ahead of, and in a direction opposite that imposed by, the horizontal dynamic convergence system on the blue beam. Structurally, one type of arrangement may be as indicated in FIGS. 4 and 5.

In this structure, the gun cluster includes three electron guns 30 which are structurally the same and are arranged in a delta array. Each gun has the usual cathode assembly 31 followed by a first grid 32 that is used to intensity modulate the beam and second, third and fourth grids 33, 34 and 35, respectively, which focus and accelerate the electron beam, directing it along an assigned beam path toward shadow mask 17 and screen 16. Following the final electrode 35, there is a convergence cylinder 40 having suitable apertures concentric with the three beam paths as required to permit the beams to pass through. The convergence cylinder is conventional and may be equipped with an internal, Y-shaped magnetic shield (not shown) to partition three chambers for accommodating the three beams and their individual convergence fields magnetically isolated from one another.

There are three pairs of convergence pole pieces 43 individually assigned to one of the three beams. Each such pair is disposed on opposite sides of the path of its assigned beam. Similarly, there are electromagnets 44 associated with each pair of pole pieces and having coils or windings to which dynamic convergence signals are applied for the purpose of energizing each magnet and establishing in the space between its pair of pole pieces a desired convergence field. Usually, the electromagnets have individual horizontal and vertical windings to which the corresponding convergence signals are applied from sources 23 and 24.

Following the electromagnetic structure of the convergence system, the gun cluster has the usual snubber springs 47 which connect with a conductive coating deposited on the inner surface of the conical section of the tube envelope and serving to extend the high voltage circuit to the final anodes 35 of each of the three guns. The gun cluster may also support a getter structure 48.

The convergence signal sources 23 and 24 of FIG. 1 for energizing the coils of electromagnets 44 are well known and no claim of novelty is predicated on their circuitry. Accordingly, they have not been shown in detail. They provide energizing currents at both the horizontal and vertical frequencies of such amplitude and waveform, or time-intensity characteristic, as required to maintain the desired convergence condition of the three beams as they are scanned across the image area of tube 15 under the influence of the field produced by yoke 25. To this extent this constitutes a conventional dynamic convergence system.

Figure 6:
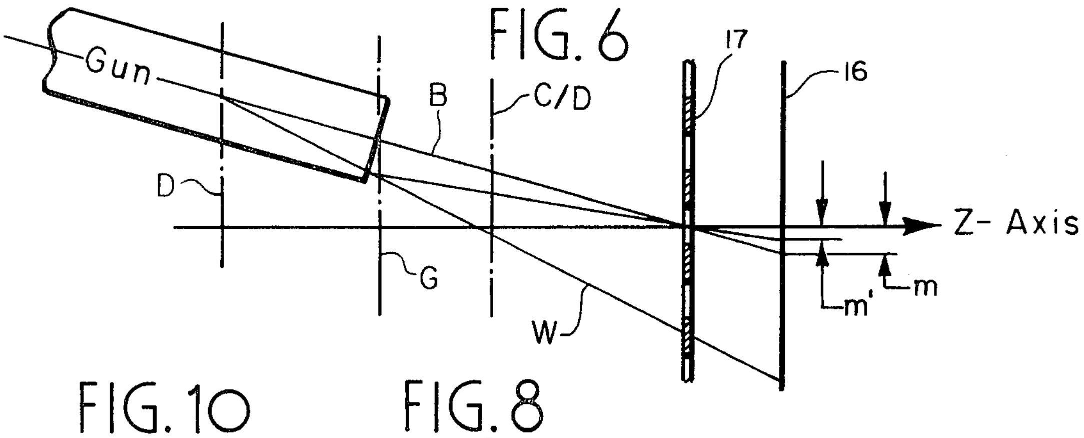
FIG. 6 is a sketch used in explaining the correction of blue droop.

One type of the supplemental dynamic field arrangement added in accordance with this invention is very similar in structure and, in a sense, is essentially a third of the electromagnetic structure of the conventional dynamic convergence system. As illustrated in FIGS. 4 and 5, it comprises a single additional electromagnet 50 positioned externally of the tube neck adjacent the G2-G3 inter-electrode space of the blue gun. This is the space between electrodes 33 and 34. The electromagnet has a U-shaped core and its terminals or pole pieces are in closer space relation to the electrodes of the blue gun than to the electrodes of the remaining guns. The legs of the core support windings or coils 51 which, for the simplest case, are connected to horizontal convergence source 23 of FIG. 1 to be energized by a current of horizontal frequency that this source delivers to the blue electromagnet of the principal dynamic convergence system. Actually, and as illustrated in the aforementioned U.S. Pat. No. 2,903,662, source 23 has three outputs, one for the horizontal winding of each of the three electromagnets of the dynamic convergence system and coils 51 are energized with the horizontal signal supplied to the blue electromagnet. This is usually a current of parabolic waveform and gives rise to a supplementing dynamic field represented by the flux lines of FIG. 5. The field is opposite in polarity to the horizontal convergence field component developed by the blue electromagnet of the normal dynamic convergence system. Its effect is indicated in the sketch of FIG. 6 which concerns itself with the influence of the supplementing field on only the blue beam in the horizontal scanning direction. Confinement of the supplemental field to the blue beam may be realized in practice by enclosing within the appropriate section of the tube neck a magnetic shield to isolate the field from the red and green beams.

FIG. 6 represents a segment of screen 16, shadow mask 17, the plane of deflection C/D, the convergence plane G where the three beams are bent or deflected by the normal convergence system, as well as the prebend plane D where the blue beam is bent or deflected by the supplementing dynamic field structure. Z is a reference axis passing through the center of a dot triad. Where the blue beam B is subjected to the conventional dynamic convergence system in the presence of astigmatism of the deflection field it strikes screen 16 at a point which is displaced a distance *m* from the reference axis Z so that *m* represents the separation of the blue spot from its triad center. As explained above, at the 3 and 9 o'clocks in particular where blue droop is most pronounced, the distance *m* is substantially larger than the value required for the blue beam to be in proper registration with the blue phosphor dot. When the influence of the supplementing dynamic field established by structure 50 is taken into consideration, the blue beam is prebent or deflected ahead of, that is to say, to the gun side of the convergence plane G and is directed along the line W. It is redirected by the oppositely poled horizontal component of the blue dynamic convergence field developed by the normal convergence system and strikes the screen at a position which may be displaced from reference axis Z by the amount $m'$. This indicates that the blue droop at 3 and 9 0'clock can be lessened or decreased by the amount $m-m'$ and the strengths of the fields of the normal convergence system and the supplemental field structure are adjusted to minimize the blue droop along the horizontal scanning direction compatible with best spot to dot registration.

Figure 7B:
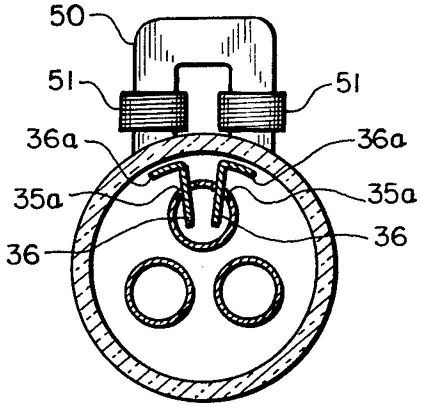
Figure 7A:
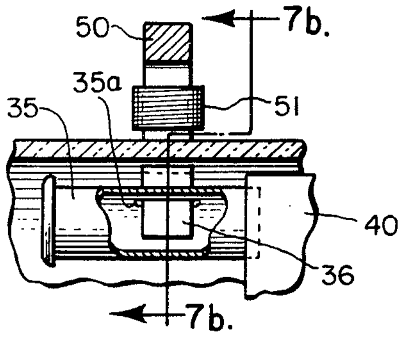

The circumstance depicted by FIG. 6 is concerned only with correcting the displacement of the blue spot from its required or ideal position because of astigmatism of the deflection field. This type of operation could be realized, for example, with the structural arrangement of FIGS. 7*a* and 7*b* which indicate that the electrode 35 has been elongated to accommodate slots 35*a* through which a pair of pole pieces 36 may extend to be positioned on opposite sides of the path of travel of the blue beam. At their outer extremities the pole pieces have flanges 36*a* that are as close as practicable to the inner wall of the neck section of the tube envelope so as to have close coupling with the pole pieces of electromagnet 50 of the supplemental field structure. The supplementing field is mainly confined to the path of the blue beam assuming, of course, that the G4 electrode 35 is made of stainless steel or some other nonmagnetic material.

A preferred arrangement, however, employs no shield and positions electromagnet 50 to permit the supplemental field to extend to the paths of the red and green beams as indicated in FIG. 5 where the beams are designated R, G and B. The field strength is, of course, decreased by the time it reaches the paths of red and green beams so that it displaces them less than the blue beam. The dimensions of core 50 and its orientation relative to gun cluster establishes a field distribution as represented in FIG. 5 in which the field is approximately horizontally disposed at the path of the blue beam so that the displacement of that beam is essentially in a vertical plane or radial relative to the center of the spot triad. With respect to the paths of the red and green beams, however, the flux lines of electromagnet 50 are canted in such a way that the deflection of these beams is radially opposite to the deflection of the blue beam. The directions of beam displacement are indicated in the vector diagram of FIG. 8. Vector B shows the prebending of the blue beam to be in a grouping direction. With a configuration as shown in FIG. 5, vectors R and G are smaller to indicate a smaller deflection of these beams and their directions indicate that these beams are displaced in a degrouping sense, outwardly of the center. With respect to the center of the spot triad, the radial movements of the red and green beams are oppositely directed relative to that of the blue beam. With reference to the triad astigmatism experienced at the 3 and 9 o'clock positions, as indicated in FIG. 2, a substantial reduction of triad astigmatic distortion is achieved. The red and green beams which tend to be grouped by astigmatism of the deflection field receive a degrouping displacement by the supplementing field, while the blue beam which is degrouped by astigmatism of the deflection yoke receives a grouping correction. Furthermore, the relative intensities are in accordance with the grouping and degrouping corrections required to achieve material improvement in spot triad/phosphor dot triad registration at these positions of the raster.

The blue droop correction accomplished by the horizontal frequency supplementing field is primarily effective in a horizontal direction or along the major axis of the scanning pattern. If the horizontal-frequency exciting current is of parabolic waveform, it affords maximum correction at the ends of the scan most remote in opposite directions from the center which, of course, correspond with the 3 and 9 o'clock positions. There is no need for change at the center and, therefore, a plot of current against deflection in the horizontal direction may be as indicated by curve R in FIG. 9. The intercept of the axes is the center of the scan where the parabolic correcting current has a reference value such as zero. This condition is easily obtained through the use of well-known clamping circuits, one of which is included in the disclosure of the aforesaid U.S. Pat. No. 2,903,662. Clamps to accomplish this purpose may be considered to be included in the horizontal convergence source 23 from which the energizing current for coil 51 of the supplemental electromagnet is derived.

With the use of a clamped correcting current as described in connection with FIG. 9, there is little if any correction of triad astigmatism at the 6 and 12 o'clock positions occasioned by the supplementing field at the horizontal frequency but this additional correction may be introduced by using an alternating current coupling of the correcting signal from source 23 to coil 51. For this case the plot of current *v.* deflection is indicated by the broken construction line curves of FIG. 9 which produces much the same result in the 3 and 9 0'clock positions as that already described. At the 6 and 12 o'clock positions, however, the correcting conditions are modified as represented by the vector diagram of FIG. 10. Again, the red and green beams are displaced in one sense relative to the center of the beam spot triangle while the blue beam is displaced in an opposite sense and their respective displacements are the converse of those in FIG. 8. Specifically, the blue beam is displaced in a degrouping sense while the red and green beams are displaced in a grouping sense. With reference to the uncorrected conditions shown in FIG. 2, this is a change in the proper direction at the 6 and 12 o'clock positions. Of course, some control of the blue beam prebending at the 6 and 12 o'clock positions is available through the nature of the coupling circuitry. Maximum prebending at these positions results from pure a.c. coupling from source 23 to electromagnet 50 and lesser amounts of prebend occur where the coupling is partially a.c. and partially d.c. which is readily achievable with well-known circuitry. If some a.c. coupling of the horizontal signal to electromagnet 50 is employed, as here suggested, it will certainly be necessary to adjust the principal and supplemental dynamic fields for the best compromise over the raster.

A different approach to achieve correction over greater areas of the scanning raster suggests itself from the description thus far. Indeed, the supplemental field structure may be energized at both the horizontal and vertical frequencies by means of signals from both sources 23 and 24 with the horizontal-frequency component of the supplemental field directed to effecting correction along the major axis and the vertical-frequency component thereof correcting in the orthogonal direction or along the minor axis of the scanning field. This is not a difficult change in the structure since it merely entails associating both horizontal and vertical windings with core 50 which may be accomplished in essentially the same manner as horizontal and vertical coils are now associated on a common core in a conventional dynamic convergence system. Preferably, in using horizontal and vertical correction signals, both are to be clamped.

Some latitude is available in the location of the prebend plane. The further this plane is placed from the convergence plane, in the direction of the cathode of the blue gun, the more spot distortion may be expected, and as the prebend plane is placed closer to the convergence plane spot distortion decreases but the energy required for the supplemental field structure increases to achieve the same amount of blue droop correction. It is currently believed, based on operating embodiments of the invention, that a location at about the G2, G3 interelectrode space is a good compromise and one way of minimizing spot distortion may be utilization of the known technique of dynamic focusing.

The described triad astigmatism correction, but using the horizontal frequency component only, may as a practical matter involve some disturbance at the center of the scanning raster and, if so, it is necessary to adjust the strength of the principal convergence fields as well as the supplementing field for the best compromise. The correction is nevertheless most desirable because without it a compromise is otherwise required between light output and guard band. This is a less desirable compromise and is avoided by the use of the described correction arrangement. Noticeable improvement in blue droop has been obtained on shadow mask tubes featuring the described blue droop correction.

Some flexibility is available with respect to energizing the supplemental field structure in attaining a desired amount of blue droop correction. For example, the coils of electromagnet 50 may be prepared with a predetermined number of turns and the intensity of the exciting currents from sources 23 and/or 24 may be tailored or adjusted to provide the desired amount of correction. Alternatively, currents of fixed intensity, perhaps equal to that delivered to the electromagnet structure 44 of the principal convergence system, may be supplied to electromagnet 50 in which case the coil turns of that structure are chosen to effect a given amount of correction.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In a color television system comprising (1) a cathode-ray tube having an image screen bearing a multiplicity of phosphor dot triads individually including a dot of green, a dot of blue and a dot of red phosphor and further having a neck section enclosing three electron guns for producing a delta array of three electron beams for exciting an assigned color phosphor of said dot triads, (2) a magnetic deflection yoke for producing across the paths of said beams a scanning field for deflecting said beams over said screen in a repeating series of parallel lines, (3) a dynamic convergence system, including a plurality of electromagnetic field developing means individually associated with assigned ones of said beams, respectively, and energized by signals of horizontal and vertical frequencies, for developing dynamic convergence fields to maintain said three beams converged to define an equilateral beam spot triad in registration with said dot triads as said beams scan said screen but which, in the presence of astigmatism in said deflection field, distorts said spot triad by displacing two of said beams on the same sense relative to the center of said equilateral triad and displacing the third beam in an opposite sense relative to said center of said equilateral triad, the improvement which comprises a single supplemental electromagnetic field developing structure positioned externally of said neck section and adjacent that one of said guns producing said third beam and energized by the horizontal or vertical frequency component of the dynamic signal applied only to that one of said electromagnetic means which is associated with said third beam to develop a supplementing dynamic field component at said horizontal or vertical frequency, which is opposite in polarity to, and has a time-intensity characteristic related to that of, the corresponding dynamic field component developed by said one electromagnetic means, for prebending said third beam before that beam enters the convergence field of said one electromagnetic means to compensate for the displacement of said third beam attributable to said astigmatism.

2. The color television system improvement in accordance with claim 1 in which said supplemental field developing structure includes a coil which is energized only by the horizontal frequency component of the dynamic signal applied to said one electromagnetic means.

3. The color television system improvement in accordance with claim 2 in which said component of horizontal frequency has a parabolic waveform and is clamped to a reference value at its peak.

4. The color television system improvement in accordance with claim 2 in which said supplemental field developing structure includes a pair of coils which are energized, respectively, by said horizontal and said vertical components of the dynamic signal applied to said one electromagnetic means.

5. The color television system improvement in accordance with claim 2 in which said supplementing dynamic convergence field not only crosses the path of said third beam but also extends, although with reduced intensity, to the path of said two beams to compensate said astigmatism by displacing all three of said beams in a radial direction relative to the center of said beam spot triangle with the displacement of said third beam being directed oppositely to the displacements of said two beams.

6. The color television system improvement in accordance with claim 5 in which said component of horizontal frequency has a parabolic waveform and is a.c. coupled to said coil.

7. The color television system improvement in accordance with claim 5 in which said electron guns have a plurality of coaxially aligned cylindrical electrodes arranged in cluster and supported within the neck section of said cathode-ray tube, and in which said supplemental field developing structure is positioned externally of said cathode-ray tube adjacent an interelectrode space of said guns and has pole pieces supported at said neck section in closer space relation to the gun of said cluster that develops said third beam than with respect to the remaining guns of said cluster.

* * * * *